United States Patent [19]
Geisheker et al.

[11] Patent Number: 5,765,713
[45] Date of Patent: Jun. 16, 1998

[54] FUEL TANK WITH OPTIONAL OUTLETS

[75] Inventors: Richard C. Geisheker, Oconomowoc; Thomas L. Barnhardt, Hartford; Daniel J. Manning, Thiensville, all of Wis.

[73] Assignee: Briggs & Stratton Corporation, Wauwatosa, Wis.

[21] Appl. No.: 518,585

[22] Filed: Aug. 22, 1995

[51] Int. Cl.$^6$ ............................................. B65D 90/10
[52] U.S. Cl. ................................. 220/562; 220/86.2
[58] Field of Search ................................ 220/562, 563, 220/564, 86.2

[56] References Cited

U.S. PATENT DOCUMENTS

| | | | |
|---|---|---|---|
| 46,906 | 3/1865 | Horton | 220/562 |
| 2,102,124 | 12/1937 | Lithgow | 220/562 |
| 2,208,621 | 7/1940 | Ball et al. | 220/562 |
| 2,840,147 | 6/1958 | Almestad | 158/46.5 |
| 3,212,824 | 10/1965 | Emery et al. | 220/562 |
| 3,318,505 | 5/1967 | Garrison et al. | 229/7 |
| 3,330,439 | 7/1967 | Moorman | 220/86 |
| 3,486,523 | 12/1969 | Mullings | 137/271 |
| 4,043,448 | 8/1977 | Tanaka | 220/339 |
| 4,214,767 | 7/1980 | Davies, III | 280/5 |
| 4,315,531 | 2/1982 | Gerhard | 220/562 |
| 4,582,211 | 4/1986 | Mandel | 220/3 |
| 4,753,371 | 6/1988 | Michielin et al. | 222/144.5 |
| 4,930,537 | 6/1990 | Farmer | 137/265 |
| 5,186,324 | 2/1993 | Brandon, Jr. | 206/223 |
| 5,249,594 | 10/1993 | Kizer | 137/15 |
| 5,293,899 | 3/1994 | Kwon | 137/544 |
| 5,312,189 | 5/1994 | Aeschbach et al. | 383/207 |

FOREIGN PATENT DOCUMENTS

| | | | |
|---|---|---|---|
| 580006 | 8/1946 | United Kingdom | 220/562 |

*Primary Examiner*—Joseph M. Moy
*Attorney, Agent, or Firm*—Michael Best & Friedrich LLP

[57] ABSTRACT

A fuel tank including a generally hollow body defining an interior volume for accommodating fuel, and a hollow stud extending from a bottom portion of the hollow body. The hollow stud defines a first outlet having an inner end and an outer end, the inner end being in operative communication with the interior volume of the hollow body. An end cap is integrally formed with the hollow stud to seal the outer end of the first outlet. Preferably, the fuel tank includes two diagonally-opposed hollow studs and two corresponding end caps. The fuel tank further includes a centrally-located hollow member defining a second outlet having an inner end and an outer end. A wall member can be integrally formed with the hollow member to provide a seal between the inner end of the second outlet and the interior volume of the hollow body. Preferably, a mounting bracket is positioned adjacent to the bottom portion of the hollow body, and the mounting bracket includes an opening for insertably receiving the hollow stud.

4 Claims, 3 Drawing Sheets

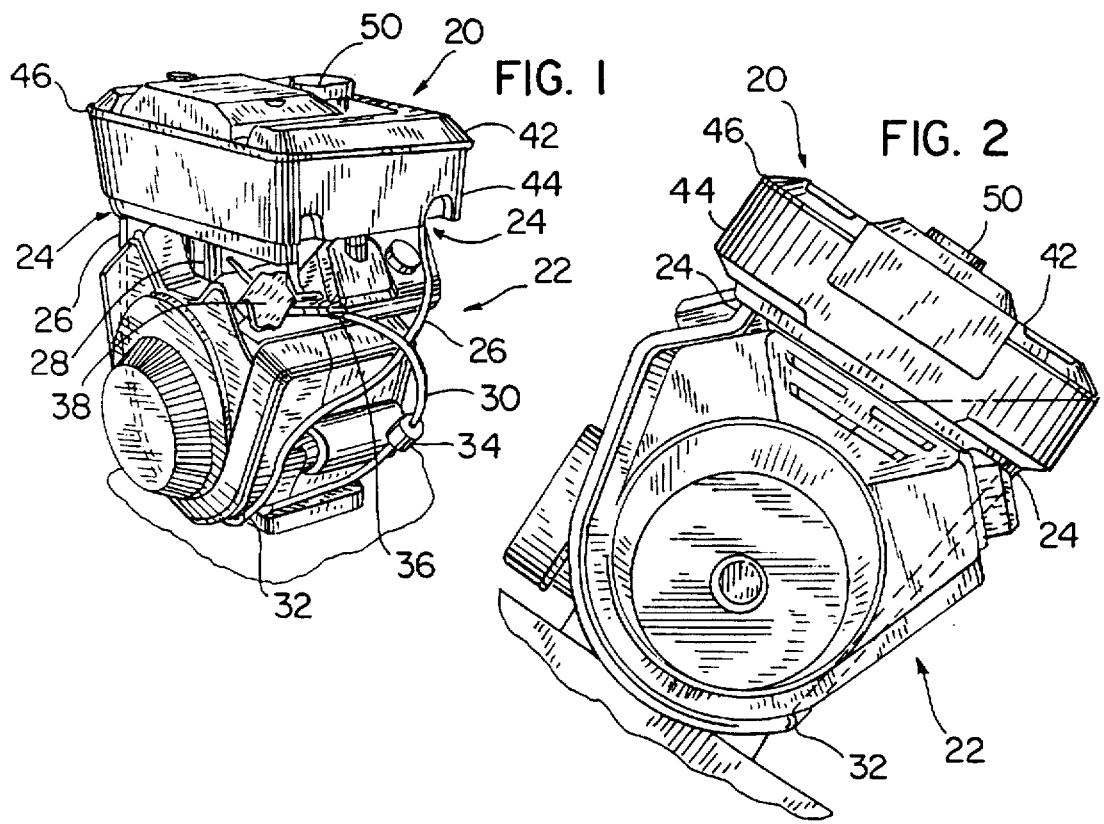
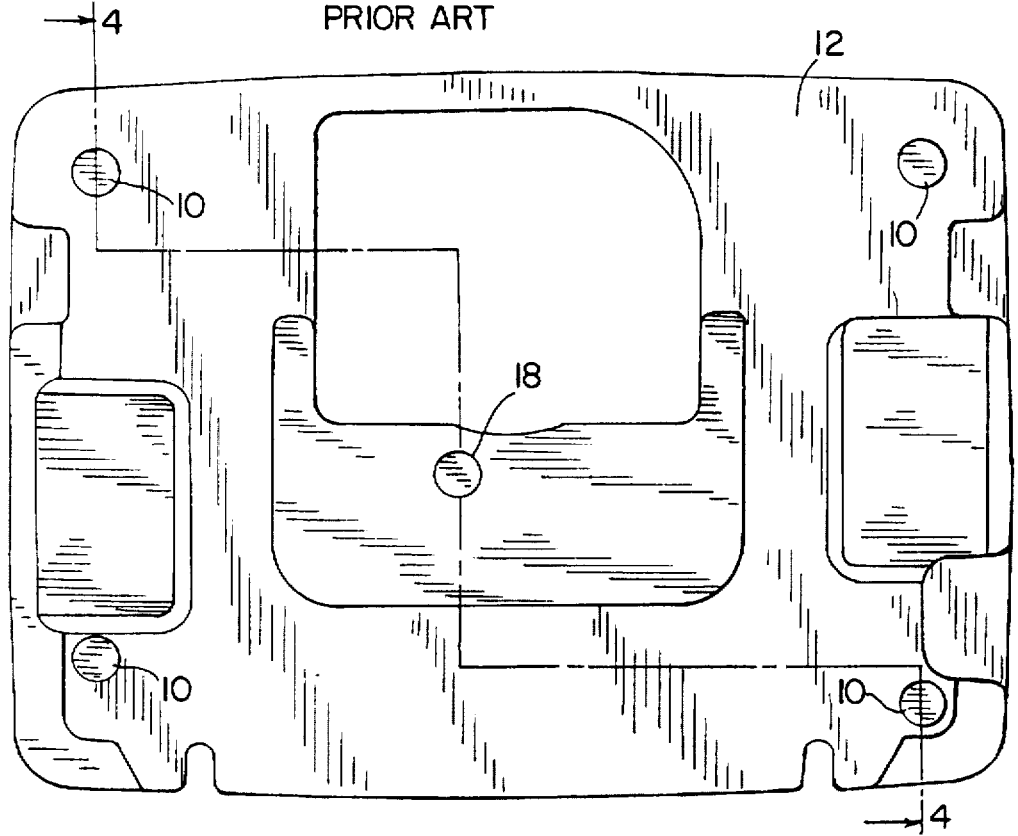

FUEL TANK WITH OPTIONAL OUTLETS

FIELD OF THE INVENTION

The present invention generally relates to the field of fuel tanks and, more particularly, to fuel tanks that are mounted to engines, lawnmowers, grass shears, snow blowers, generators and the like and that have multiple fuel outlets.

BACKGROUND OF THE INVENTION

Lawnmowers, snow blowers and generators include a fuel tank for storing fuel needed to operate the engine. Such fuel tanks commonly include a hollow member having a fuel inlet in a top portion for allowing introduction of fuel into the hollow member, and a fuel outlet in a bottom portion for allowing fuel to exit the hollow member for supply to the engine. The hollow member can be made as one piece by, for example, a rotational molding process.

The fuel outlet in fuel tanks is typically centrally located on a bottom portion of the hollow member. In this manner, fuel can be dispensed through the fuel outlet even though the fuel tank is slightly tipped to one side. However, as the fuel level approaches empty, a slight tip of the fuel tank can result in the fuel migrating to one side of the fuel tank such that the fuel is no longer in operative contact with the fuel outlet. Similarly, even with as much as one quarter of a tank of fuel, a severe tip (e.g., 45 degrees) of the fuel tank can result in enough fuel migration that the fuel is no longer in operative contact with the fuel outlet. In these situations, the engine will stop due to lack of fuel long before the fuel tank is empty. The result is shorter run times (i.e., the fuel tank must be refilled more often).

To alleviate this problem, it is known to provide two fuel outlets positioned at diagonally opposing locations on the bottom portion of the fuel tank, in addition to the centrally-located fuel outlet (FIGS. 3–5). The diagonally-opposed fuel outlets are positioned such that fuel will be in operative contact with at least one of the orifices even though the fuel tank is severely tipped (i.e., pitched or cambered) in one direction. Such fuel outlets are formed by drilling holes in the appropriate locations in the bottom portion 12 of the fuel tank. For example, some fuel tanks are provided with thick bosses 10 at each of the four corners of the bottom portion 12 (FIGS. 3–4). Such bosses 10 are drilled and tapped, and a hollow metal fitting 14 is threaded into the boss 10 to provide a member for attachment of a fuel conduit 16 (FIG. 5). The fitting 14 can be sealed with a sealant. When using the diagonally-opposed fuel outlets, the centrally-located fuel outlet 18 is typically plugged or otherwise blocked (FIG. 4).

Due to the presence of a separate fitting 14 and the potential degradation of the sealant, the above-described fuel tank can develop leaks between the fitting 14 and the threaded boss 10. The plugged centrally-located fuel outlet 18 can also be a location for fuel leaks. In addition, the separate fitting 14 can be relatively expensive, and can require significant time to install. Further, due to the drilling requirement, material shavings can enter the fuel tank, thereby requiring a separate cleaning step before the fuel tank can be used. The presence of the drilled and threaded hole can also introduce areas of weakness into the bottom portion 12 of the fuel tank.

SUMMARY OF THE INVENTION

The present invention provides a fuel tank that can facilitate diagonally-opposed fuel outlets, but which does not require the use of separate fittings and does not require a drilling and tapping operation. In addition, the fuel tank includes a centrally-located fuel outlet that does not have to be plugged when the diagonally-opposed fuel outlets are used.

In one aspect, the fuel tank includes a generally hollow body defining an interior volume for accommodating fuel, and a hollow stud extending from a bottom portion of the hollow body. The hollow stud defines a first outlet having an inner end and an outer end, the inner end being in operative communication with the interior volume of the hollow body. An end cap is integrally formed with the hollow stud to seal the outer end of the first outlet. Preferably, the fuel tank includes two hollow studs and two corresponding end caps. For example, to enhance fuel flow when the tank is tipped, the two hollow studs can be positioned near diagonally-opposing corners of the bottom portion of the hollow body. In order to use the fuel tank, the end caps can be removed by cutting.

In one embodiment, the fuel tank further includes a second outlet centrally-located in the bottom portion. The second outlet includes a hollow member having an inner end and an outer end. A wall member can be integrally formed with the hollow member to provide a seal between the inner end of the second outlet and the interior volume of the hollow body. Preferably, a mounting bracket is positioned adjacent to the bottom portion of the hollow body, and the mounting bracket includes an opening for insertably receiving the hollow stud.

The present invention also provides a method of making a fuel tank, includes the steps of forming a generally hollow body defining an interior volume for accommodating fuel, and securing (e.g., integrally forming) at least one hollow stud (e.g., two hollow studs) onto a bottom portion of the hollow body (e.g., near diagonally-opposing corners of the bottom portion). The hollow stud defines a first outlet having an inner end and an outer end, the inner end being in operative communication with the interior volume of the hollow body. The method further includes the step of integrally forming an end cap onto each hollow stud to seal the outer end of the first outlet.

In one embodiment, the step of forming a generally hollow body includes the steps of molding the bottom portion of the hollow body, molding a top portion of the hollow body, and securing (e.g., welding) the top portion to the bottom portion. Preferably, the molding steps includes injection molding. In another embodiment, a second outlet is disposed in a central area of the bottom portion of the hollow body. The second outlet includes a hollow member having an inner end and an outer end. Preferably, a wall member is integrally formed with the hollow member to provide a seal between the inner end of the second outlet and the interior volume of the hollow body. A mounting bracket can be secured to the hollow body to facilitate mounting the fuel tank to the appropriate device or engine. In this regard, the hollow stud can be inserted through an opening in the mounting bracket.

BRIEF DESCRIPTION OF THE DRAWINGS

FIG. 1 illustrates a fuel tank mounted on top of a combustion engine and having diagonally-opposed fuel outlets.

FIG. 2 illustrates the fuel tank and engine of FIG. 1 in a tilted position.

FIG. 3 illustrates the bottom of a prior art fuel tank.

3

Figure 4:
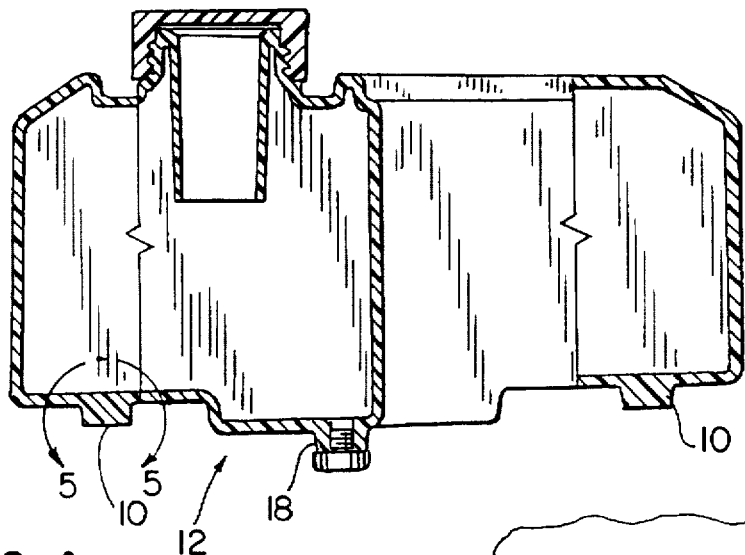
FIG. 4 illustrates a section of the fuel tank taken along line 4—4 in FIG. 3.
Figure 5:
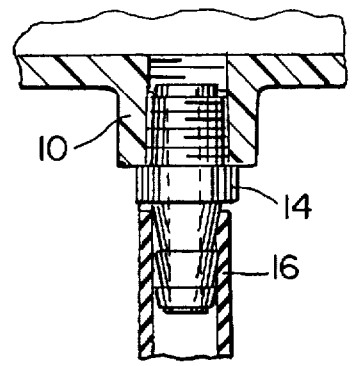

FIG. 5 illustrates a section view of a prior art fuel outlet.

Figure 6:
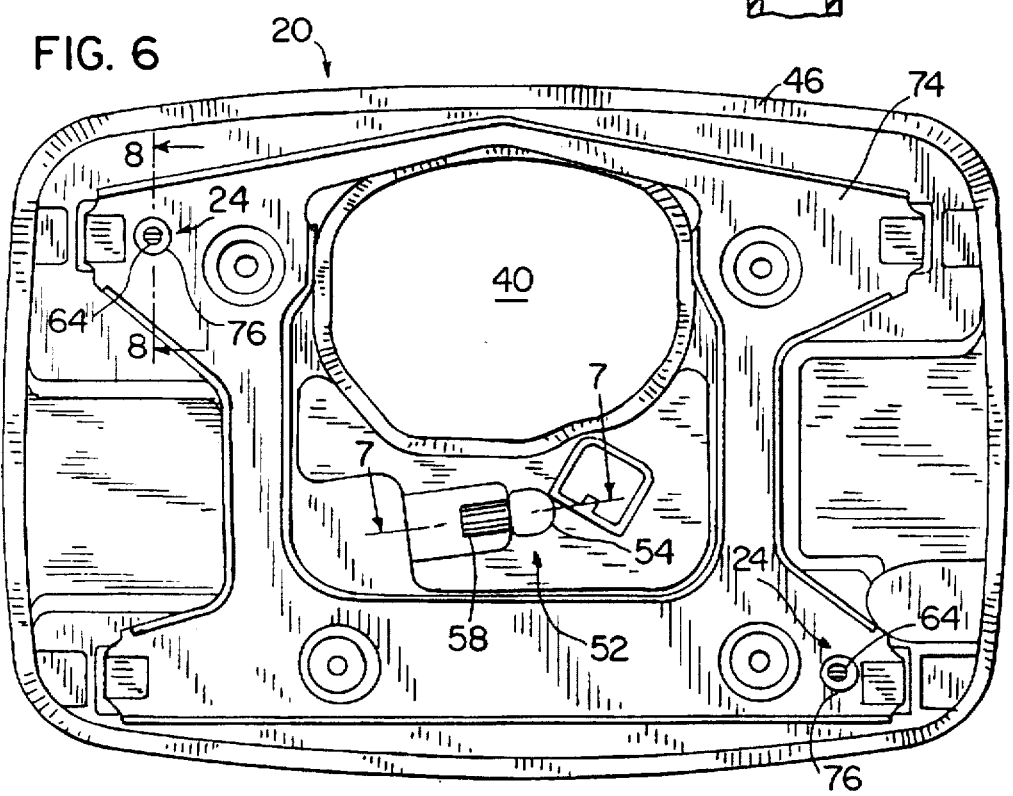

FIG. 6 illustrates a bottom view of the fuel tank illustrated in FIGS. 1 and 2.

Figure 7:
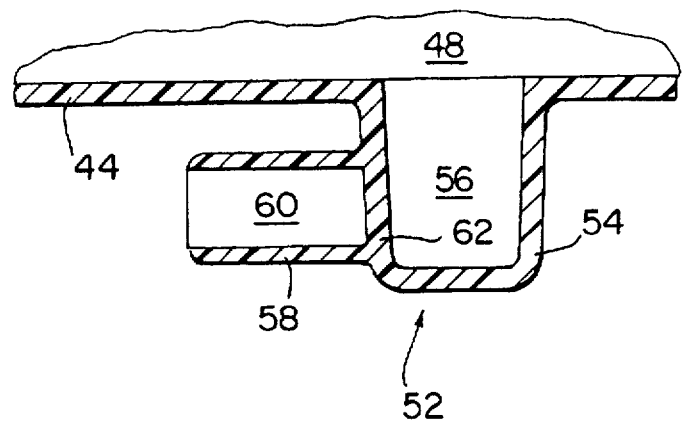

FIG. 7 is a section view taken along line 7—7 in FIG. 6.

Figure 8:
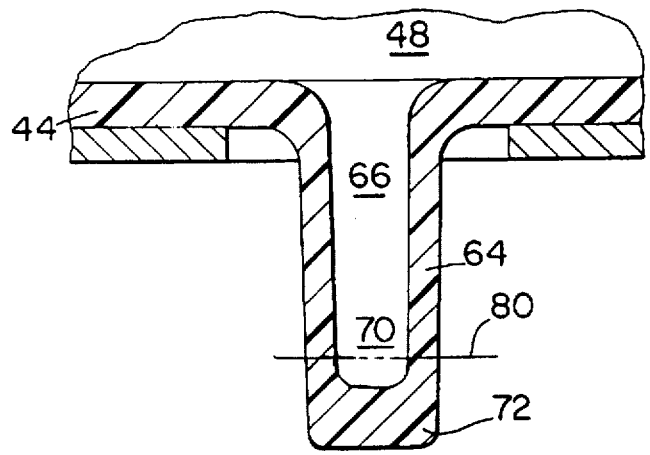

FIG. 8 is a section view taken along line 8—8 in FIG. 6.

Figure 9:
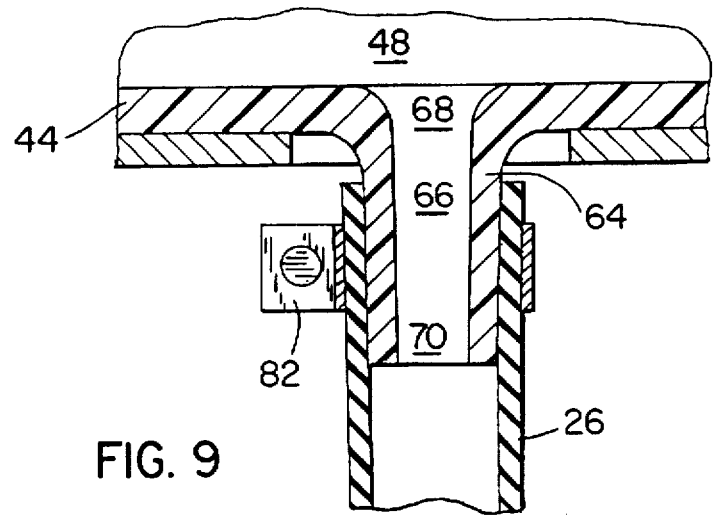

FIG. 9 illustrates a fuel outlet of the present invention.

DETAILED DESCRIPTION

FIGS. 1 and 2 illustrate a fuel tank 20 embodying the present invention and mounted on top of an internal combustion engine 22. The fuel tank 20 includes diagonally-opposed fuel outlets 24 that are operatively interconnected with fuel conduits 26 that direct the fuel from the fuel tank 20 to the carburetor 28. The fuel conduits 26 are operatively interconnected with a main fuel line 30 via a Y-connector 32. The fuel line is intersected by a fuel filter 34, a shutoff valve 36, and a fuel pump 38, as is known in the art.

FIGS. 6–9 illustrate various features of the fuel tank 20 shown in FIGS. 1 and 2. The fuel tank 20 is generally rectangular in horizontal cross section and includes a vertically-oriented opening 40 (FIG. 6) that is designed to accommodate an air cleaner (not shown). The fuel tank 20 comprises a top portion 42 and a bottom portion 44 (FIGS. 1 and 2) that are separately manufactured by an injection molding process. The illustrated top and bottom portions 42, 44 respectively are made from 66 Nylon, sold by DuPont under product number ST800BK10, although other appropriate materials could be used. The individual top and bottom portions 42, 44 respectively are welded together utilizing an appropriate method to produce a hollow body defining an interior volume 48. The top portion 42 includes a fuel inlet 50 (FIGS. 1 and 2) to facilitate introduction of fuel into the interior volume 48.

The bottom portion 44 of the fuel tank 20 includes three fuel outlets: a central fuel outlet 52 and two diagonally-opposed fuel outlets 24 (FIGS. 6–9). The central fuel outlet 52 includes a hollow housing 54 defining an interior space 56 that extends downwardly from a central area of the bottom portion 44, and is in operative communication with the interior volume 48 (FIG. 7). A cylindrical hollow member 58 extends laterally from the housing and defines a central fuel path 60 therethrough. A wall member 62 is integrally formed with the hollow member 58, and is operatively positioned between the central fuel path 60 and the interior space 56 of the housing to provide a seal therebetween. Wall member 62 may be formed by using a short sliding pin during the injection molding process. If the manufacturer of the fuel tank knows that central fuel outlet 52 will in fact be used, the fuel tank may be formed without wall member 62 by using a longer sliding pin during the molding process.

The illustrated diagonally-opposed fuel outlets 24 each include a hollow stud 64 extending from the bottom portion 44 (FIG. 8) near diagonally-opposed corners thereof. In the alternative, the hollow studs could extend from side walls of bottom portion 44, near diagonally-opposed corners of the bottom portion.

Each hollow stud 64 defines an alternative fuel path 66 having an inner end 68 in operative communication with the interior volume 48. An outer end 70 of the alternative fuel path 66 is sealed by an end cap 72 that is integrally formed with the hollow stud 64 to thereby seal the outer end 70 of the alternative fuel path 66.

The fuel tank 20 is mounted to the engine 22 via a mounting bracket 74 (FIG. 6). The illustrated mounting bracket 74 includes two circular openings 76 for insertably receiving the two hollow studs 64. In this manner, the hollow studs 64 are allowed to protrude through the mounting bracket 74 (FIG. 8), thereby facilitating securement of a fuel conduit 26 thereto (FIG. 9), as described below in more detail.

It can be appreciated that, due to the presence of the wall member 62 and the end cap 72, each of the above-described fuel outlets is sealed, thereby preventing the flow of fuel from the fuel tank 20. In order to make the fuel tank 20 operational, at least one of the fuel outlets needs to be unsealed. In this regard, the above-described fuel tank 20 can be modified to dispense fuel through either the central fuel outlet 52 or the two diagonally-opposed fuel outlets 24. For example, to utilize the central fuel outlet 52, the wall member 62 needs to be removed. This can be accomplished by punching the wall member 62 into the interior space 56 defined by the hollow housing 54. The wall member 62 can subsequently be removed through the fuel inlet 50. Alternatively, the wall member 62 can be drilled out. Due to the presence of the hollow housing 54, the shavings from the drilling operation will be maintained within the interior space 56 defined by the hollow housing 54, and therefore can be easily removed through the cylindrical hollow member 58.

To utilize the diagonally-opposed fuel outlets 24 instead of the central fuel outlet 52, the end caps on the hollow studs must be removed. This can be done by cutting or drilling. However, it is preferred that the end caps are merely snipped off using, for example, a wire cutter. For example, the hollow stud 64 can be snipped at the illustrated location 80 (FIG. 8), to thereby remove the end cap 72 (FIG. 9). A fuel conduit 26 can then be slid over the hollow stud 64 to provide a conduit for delivering fuel to the carburetor 28 (FIG. 1). For example, SAE 30R6 reinforced polyester hose can be used for the fuel conduit 26. If desired, a conventional clamping device 82 can be slid over the fuel conduit 26 to ensure secure engagement of the conduit to the hollow stud 64. It should be appreciated that, due to the presence of the wall member 62, there is no need to plug the central fuel outlet 52.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiments described herein are further intended to explain best modes known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. A fuel tank comprising:
    a generally hollow body defining an interior volume for accommodating fuel;
    a hollow stud extending from a bottom portion of said hollow body, said hollow stud defining a first outlet having an inner end and an outer end, said inner end being in operative communication with said interior volume of said hollow body;
    an end cap integrally formed as one piece with said hollow stud to seal said outer end of said first outlet; and a second outlet centrally-located in said bottom portion, said second outlet including a hollow member having an inner end and an outer end; and a wall member integrally formed with said hollow member to provide a seal between said inner end of said second outlet and said interior volume of said hollow body.

2. A fuel tank as claimed in claim 1, further comprising a mounting bracket positioned adjacent to said bottom portion of said hollow body, said mounting bracket including an opening for insertably receiving said hollow stud.

3. A fuel tank as claimed in claim 1, wherein said hollow stud is integrally formed by injection molding as one piece with said bottom portion.

4. A fuel tank comprising:

a generally hollow body defining an interior volume for accommodating fuel;

two hollow studs positioned near diagonally-opposed corners of a bottom portion of said hollow body, said hollow studs each defining a first outlet having an inner end and an outer end, said inner end being in operative communication with said interior volume of said hollow body;

an end cap integrally formed with each hollow stud to seal said outer end of each first outlet;

a second outlet centrally-located in said bottom portion, said second outlet including a hollow member having an inner end and an outer end; and a wall member integrally formed with said hollow member to provide a seal between said inner end of said second outlet and said interior volume of said hollow body.

\* \* \* \* \*